Patented Aug. 30, 1949

2,480,577

UNITED STATES PATENT OFFICE

2,480,577
REFRACTORY MATERIAL

Emanuel A. Hertzell and Richard H. Anderson, Dover, Ohio, assignors to The Robinson Clay Product Company, Akron, Ohio, a corporation of Maine No Drawing. Application May 9, 1945, Serial No. 592,912

5 Claims. (Cl. 106—67)

This invention relates to refractory material, and more especially it relates to refractory composition that may be used en masse in the manner of concrete, or which may be formed into smaller individual units such as bricks. The improved material is designed for use in furnaces and other installations where high temperatures prevail.

Among the problems encountered in the manufacture and shipment of refractory brick is that of obtaining an effective cold bond for the refractory aggregates, so that the brick may be shipped and installed in the unburned state. There are on the market at the present time certain brick that are bonded and used in this manner. However, most of the bonds used to produce shipping strength become ineffective as the temperature rises in service. As a result there are certain temperature ranges through which the brick pass wherein they possess but little mechanical strength. If the service condition is sufficiently high, the brick develop a ceramic bond when the furnace is under operating conditions. However, there is usually a definite gradation of temperature in a brick from its inside hot end to its relatively cool outside end. If there is a large corresponding gradation in strength, as is usually the case with conventional bonds used in brick that are shipped unburned, strains are set up which effect a shortening of the life of the brick.

Refractory concretes are usually made with a calcium aluminate cement as a setting or bonding agent, with a base of refractory aggregates. The disadvantage of these types of concrete is that in the amounts necessary to give a desirable cold bond, calcium aluminate is an active flux when used with ordinary acid refractories and forms compounds which melt at relatively low temperatures, thus reducing the refractory value of the material. Some refractory products employ sodium silicate or potassium silicate as bonds. Such products are air-setting and depend upon the drying action of the alkali silicate for strength. The time required for drying these products is so great that it is impractical to use them as concretes, where usually large masses of material are involved.

The more important objects of the invention are to provide an improved refractory material of the character mentioned that has a strong cold bond; that sets or bonds to an adequate degree in a relatively short time; to provide a waterproof bond for refractory aggregates; to provide a refractory material of sufficient strength to enable it to be shipped and utilized in unburned condition; to provide a material that will not decrease in mechanical strength to an unsatisfactory extent under any conditions of temperature; that may be stored at normal temperature without slaking or losing strength; and which will increase in strength as heat is applied thereto in service. Other objects will be manifest as the description proceeds.

In its broader aspects the invention consists of a refractory composition comprising a base of refractory aggregates, and a bond consisting of the reaction product of an alkali silicate and a fluoride selected from the group consisting of alkali silicon fluoride and alkali titanium fluoride. For convenience the fluorides may be referred to as $X_2Y$ fluorides.

The base of refractory aggregates may consist of any known or desired material suitable for the purpose, said material being ground to the desired grain size. A few examples of materials suitable for this use are fire clay, silica rock, olivine, bauxite, diaspore, chromite, kyanite, magnesite, zirconia, and others. Some of these materials are best used in the burned or calcined state, whereas others may be used in unburned condition. In some cases a mixture of calcined and uncalcined material will give best results.

The alkali silicate employed is either sodium silicate or potassium silicate. It may be used either in the dry, powdered form known as soluble glass, or it may be dissolved in water and used as a solution, known as water glass. When the dry form of the silicate is used, water is added to the dry mix to dissolve it.

The alkali component of the several fluorides set forth may be either sodium, potassium, lithium, or ammonium, and the fluoride will preferably constitute from about 0.4% to about 1.0% of the mix.

The following examples are illustrative of the invention, but it will be understood that the invention is not limited thereto:

Example I

| | Per cent |
|---|---|
| Ground fire brick | 88.6 |
| Pulverized plastic clay | 5.0 |
| Powdered sodium silicate containing 1 part of soda to 3.2 parts of silica | 6.0 |
| Sodium titanium fluoride | 0.4 |
| Water 18% based on the weight of the dry ingredients. | |

Example II

|  | Per cent |
|---|---|
| Ground calcined fire clay | 82.5 |
| Pulverized plastic clay | 5.0 |
| Sodium silicate solution containing 1 part of soda to 3.9 parts of silica | 12.0 |
| Sodium silicon fluoride | 0.5 |

When used in the manner of concrete, the improved material develops considerable strength in 48 hours, and if drying heat is applied the strength increases greatly and rapidly. When exposed to the high temperatures that obtain in service, these concretes develop a glassy bond with corresponding increase in strength.

The material can be formed into bricks by any known method employed by industry for the manufacture of refractory brick. Thus they may be dry pressed, hand molded, hand molded and repressed, or cast. After the bricks are formed, they are dried at about 210° F., during which time they develop great strength. The bond thus formed is waterproof, and the bricks can be stored in normal atmosphere without slaking or losing strength. The invention enables prompt shipment of orders without requiring excessive amounts of brick to be carried in stock at the plants. The invention also results in the elimination of the usual drying and burning losses.

The precise proportions of the materials employed may be varied, and other materials having equivalent properties may be employed if desired, without departing from the spirit of the invention or the scope thereof as defined by the appended claims.

What is claimed is:

1. Refractory material consisting of ground calcined fire clay about 82.5%, pulverized plastic clay about 5.0%, liquid sodium silicate with a ratio of 1 part soda to 3.9 parts silica about 12.0%, and sodium silicon fluoride about 0.5%.

2. Refractory material consisting of ground fire brick about 88.6%, pulverized plastic clay about 5.0%, powdered sodium silicate with a ratio of 1 part soda to 3.2 parts silica about 6.0%, sodium titanium fluoride about 0.4%, and water about 18% of the weight of the dry materials.

3. Refractory material consisting of refractory aggregates, and a bond therefor comprising the reaction product of a sodium silicate soluble glass and a sodium X fluoride wherein X is a member of the group consisting of silicon and titanium, said fluoride constituting from about 0.4% to 1.0% of the mix, and said mixture setting to a hard refractory product under conditions devoid of pressure and burning.

4. Refractory material consisting of a refractory aggregate, powdered sodium silicate with a ratio of 1 part soda to 3.2 parts silica, water, and a sodium X fluoride wherein X is a member of the group consisting of silicon and titanium, said fluoride constituting from about 0.4% to 1.0% of the dry constituents of the material, and said mixture setting to a hard, refractory product under conditions devoid of pressure and burning.

5. Refractory material consisting of a refractory aggregate, liquid sodium silicate with a ratio of 1 part soda to 3.9 parts silica, a sodium X fluoride wherein X is a member of the group consisting of silicon and titanium, said fluoride constituting from about 0.4% to 1.0% of the mix, and said mixture setting to a hard refractory product under conditions devoid of pressure and burning.

EMANUEL A. HERTZELL.
RICHARD H. ANDERSON.

REFERENCES CITED

The following references are of record in the file of this patent:

UNITED STATES PATENTS

| Number | Name | Date |
|---|---|---|
| 1,837,614 | Gramberg | Dec. 22, 1931 |
| 1,883,675 | Frank et al. | Oct. 18, 1932 |
| 1,973,731 | Snell | Sept. 18, 1934 |
| 1,973,732 | Snell | Sept. 18, 1934 |
| 2,208,571 | Dietz et al. | July 23, 1940 |
| 2,240,393 | Dietz | Apr. 29, 1941 |
| 2,323,029 | Goodrich | June 29, 1943 |

OTHER REFERENCES

Serial No. 380,605, Dietz. (A. P. C.), published May 11, 1943.

Serial No. 436,541, Pesselecq. (A. P. C.), published May 11, 1943.